UNITED STATES PATENT OFFICE.

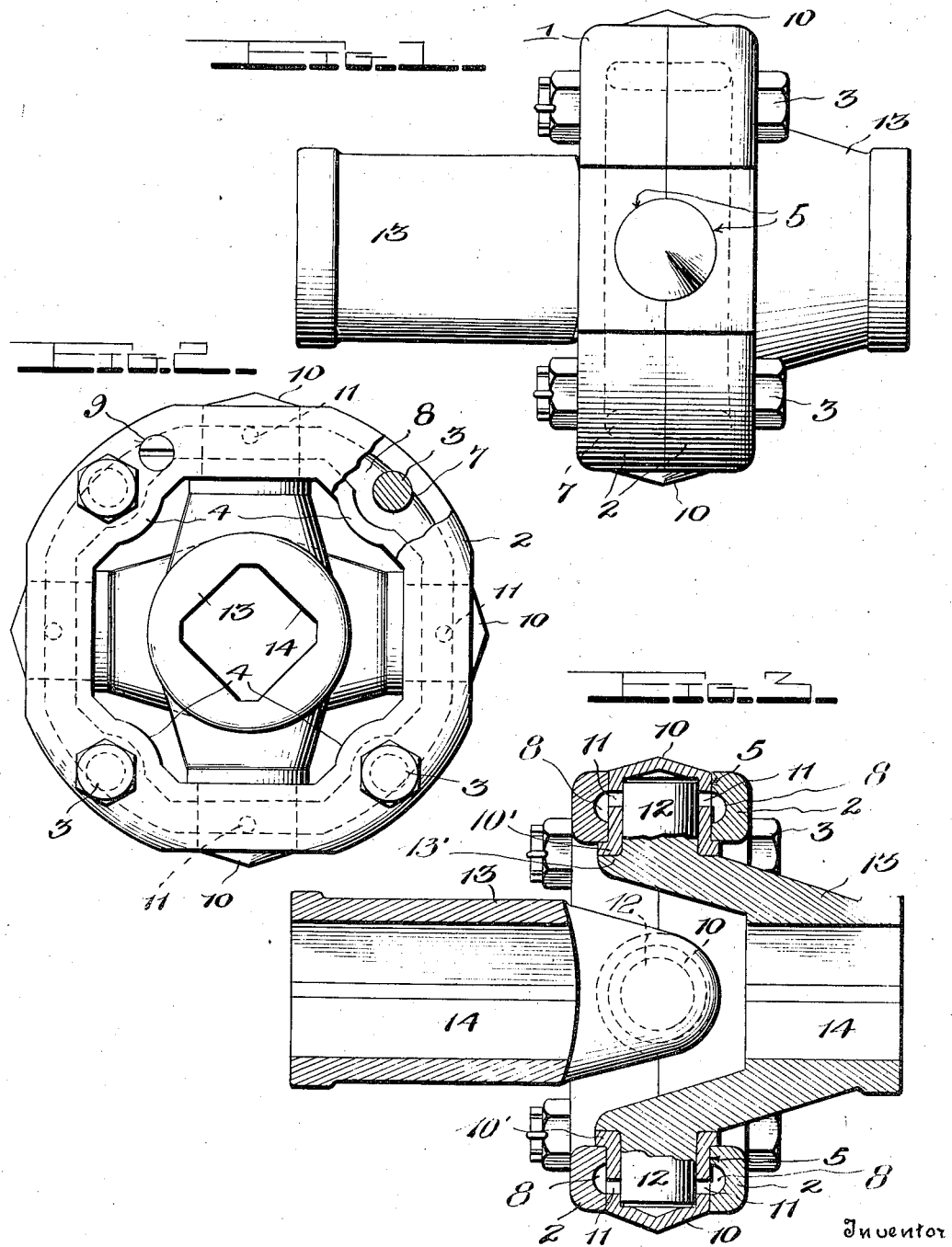

CARL E. SWENSON, OF ROCKFORD, ILLINOIS.

UNIVERSAL JOINT.

1,167,229.  Specification of Letters Patent.  Patented Jan. 4, 1916.

Application filed February 11, 1915. Serial No. 7,573.

*To all whom it may concern:*

Be it known that I, CARL E. SWENSON, a citizen of the United States, residing at Rockford, in the county of Winnebago and State of Illinois, have invented certain new and useful Improvements in Universal Joints; and I do declare the following to be a full, clear, and exact description of the invention, such as will enable others skilled in the art to which it appertains to make and use the same.

My invention relates broadly to improvements in universal joints and more particularly to lubricating means therefor.

It is a well known fact that machine designers, endeavor to so construct their machines as to eliminate the necessity of using universal joints, and that such designing often causes a great number of unnecessary and cumbersome parts. The reason for this is that the universal joint of the present day type is provided with such inefficient means of lubrication, as to render it very undesirable, on account of the immense amount of wear which takes place at the various bearings thereof.

It is therefore the object of my invention to provide simple and efficient means whereby all of the bearings of the joint may be effectively lubricated at all times, thus reducing the amount of friction existing at these points, and practically eliminating wear.

With this object in view, the invention resides in certain novel features of construction and combination hereinafter described and claimed and shown in the drawings wherein:—

Figure 1 is a side elevation of a joint constructed in accordance with the invention; Fig. 2 is an end view thereof with a portion of one of the rings broken away and showing one of the bolts passing therethrough in section; and Fig. 3 is a central longitudinal section of the joint.

In this drawing, constituting a part of the application, the numeral 1 designates an annular connecting member which is formed of a pair of axially alined rings 2 provided with flat inner faces which contact with each other and which are secured in such contact by a plurality of bolts 3 passing through the rings, the latter being preferably enlarged slightly on their inner sides at the points where the bolts pass therethrough, as indicated at 4 in Fig. 2.

At four points, spaced ninety degrees apart, each ring 2 is provided with a radial semi-cylindrical groove 5 in its inner face, the grooves of the two rings registering when said rings are clamped together to provide cylindrical bearing openings. These openings intercept and are of less diameter than the width of a circumferentially extending oil channel 7 which may be filled by removing the plug 9. This channel 7 is formed by providing the abutting faces of the two rings 2 with annular grooves 8, which grooves register with each other when said rings are clamped together. Before clamping said rings together, however, a plurality of cylindrical bushings 10 are disposed in the registering grooves, after first positioning said bushings upon studs 12 with which a pair of heads 13 are provided, said heads being forked as disclosed in Fig. 3 and being equipped with shoulders 13' on the ends of their arms. These shoulders abut the open inner ends of the bushings 10, which ends are provided with flanges 10' abutting inner sides of the rings 2 to prevent outward movement of said bushings. As likewise disclosed in Fig. 3, the outer ends of the circular bushings 10 are closed, and their curved side walls are provided with perforations 11 whose outer ends communicate with the oil channel 7, whereby oil may be conveyed therefrom into the interior of the bushings for lubricating the same, to allow the studs 12 to oscillate freely therein.

In addition to the features above described, each of the heads 13 is preferably provided with an angular bore 14, these bores being adapted to receive the squared ends of a pair of shaft sections (not shown). It is therefore evident, that as one of these heads is rotated, the connecting member 1 will likewise be rotated to drive the other head, and that during this operation, the various bushings or bearings will be effectively lubricated, even though the oil level within the channel 7 may recede to an appreciable extent, since oil will be trapped at all times in the lowermost part of the channel 7, which oil will freely run through the perforations 11 as the various bushings 10 and studs 12 move to their lowermost position.

By constructing the device as shown in the drawings and as previously described herein, it will be evident that although the changes made over a common type of universal joint are comparatively slight, yet that these alterations will greatly increase the efficiency of the joint and will likewise decrease the disadvantages now possessed by such machine elements. It may be further stated, however, that the closures of the outer ends of the bushings 10 are of such formation as to allow considerable oil to accumulate within said bushings between said closures and the ends of the studs 12, thus still further facilitating the proper action of the joint.

I claim:—

1. A universal joint comprising a connecting member formed of a pair of axially alined rings secured together, the abutting faces of said rings having a plurality of registering radial grooves constituting bearings, and registering circumferentially extending oil grooves connecting the radial grooves and serving as lubricating means for such bearings, combined with two pairs of studs mounted for oscillation in the bearings, and shaft sections to which said studs are secured.

2. A universal joint comprising an annular connecting member formed of two axially alined rings secured together and having registering radial grooves in their abutting faces, said faces also having registering circumferentially extending oil grooves, and bushings clamped between the two rings and disposed in the registering radial grooves therein, said bushings having perforations opening into the registering oil grooves, in combination with radially extending studs mounted for oscillation in the bushings, and a pair of shaft sections to which said studs are secured.

3. A universal joint comprising an annular connecting member formed of two axially alined rings secured together and having registering radial grooves in their abutting faces, said faces also having registering circumferentially extending oil grooves intercepting the radial grooves, and bushings clamped between the two rings and disposed in the registering radial grooves therein, said bushings having perforations opening into the registering oil grooves, in combination with two pairs of studs mounted for oscillation in said bushings, and shaft sections to which the studs are secured.

4. A universal joint comprising an annular connecting member having two pairs of radial openings extending from its inner to its outer side, the body of said member being formed with an annular oil channel intercepting said radial openings, bushings inserted in said openings and having perforations opening into the oil channel, said bushings likewise having closed outer ends, two pairs of studs mounted for oscillation in said bushings, and a pair of shaft sections to which said studs are secured.

5. A universal joint comprising an annular connecting member having two pairs of radial openings extending from its inner to its outer side, the body of said member being formed with an annular oil channel intercepting said openings, bushings inserted in said openings and having perforations communicating with the oil channel, said bushings having closed outer ends and stop means on their inner ends for preventing outward movement, two pairs of studs mounted for oscillation in said bushings, and shaft sections to which said studs are secured.

6. A universal joint comprising an annular member having a plurality of radial openings extending from its inner to its outer face, the body of said member being formed with an annular oil groove intercepting said openings, bushings inserted in the latter and having perforations communicating with the oil channel, said bushings having closed outer ends and annular stop flanges on their inner ends for preventing outward movement, and a pair of shaft sections each having a pair of studs mounted for oscillation in said bushings, said shaft sections also having stop means for preventing inward movement of the bushings.

In testimony whereof I have hereunto set my hand in presence of two subscribing witnesses.

CARL E. SWENSON.

Witnesses:
LEVIN FAUST,
C. H. CARLSON.